(12) United States Patent
Liu et al.

(10) Patent No.: US 11,655,189 B2
(45) Date of Patent: May 23, 2023

(54) METHOD FOR PREPARING HOT-MIXED ASPHALT MIXTURE

(71) Applicant: Tongji University, Shanghai (CN)

(72) Inventors: Liping Liu, Shanghai (CN); Lijun Sun, Shanghai (CN); Qingbing Lu, Shanghai (CN); Mingchen Li, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 325 days.

(21) Appl. No.: 16/989,479

(22) Filed: Aug. 10, 2020

(65) Prior Publication Data

US 2021/0114932 A1  Apr. 22, 2021

(30) Foreign Application Priority Data

Oct. 18, 2019 (CN) .......................... 201910992801.3

(51) Int. Cl.
*C04B 26/26* (2006.01)
*C04B 14/28* (2006.01)
*E01C 7/18* (2006.01)
*E01C 19/10* (2006.01)

(52) U.S. Cl.
CPC .............. *C04B 26/26* (2013.01); *C04B 14/28* (2013.01); *E01C 7/182* (2013.01); *E01C 19/1009* (2013.01)

(58) Field of Classification Search
CPC ................................ C04B 26/26; C04B 14/28
See application file for complete search history.

(56) References Cited

U.S. PATENT DOCUMENTS 4,468,125 A * 8/1984 Ohlson ................. B01F 35/881
366/8

FOREIGN PATENT DOCUMENTS

| CN | 101696562 B | * | 1/2012 | |
| CN | 107352853 A | * | 11/2017 | ............. C04B 26/26 |
| CN | 108589473 A | * | 9/2018 | |
| CN | 106830765 B | * | 6/2019 | |
| CN | 111116101 A | * | 5/2020 | |

OTHER PUBLICATIONS

R.P. Panda; Sudhanshu Sekhar Das; P.K. Sahoo. "An empirical method for estimating surface area of aggregates in hot mix asphalt," Apr. 2016. Journal of Traffic and Transportation Engineering, vol. 3, Issue 2, pp. 127-136. (Year: 2016).*
W Hashim, M N M Noor, E Shaffie, Z A Rahman, A K Arshad. "Cooling time of porous asphalt pavement affecting compaction process due to various raining condition," 2018. IOP Conference Series: Earth and Environmental Science. (Year: 2018).*
English machine translation of CN 101696562B, Year 2012. (Year: 2012).*
English machine translation of CN 111116101A, Year 2020, Month May. (Year: 2020).*
English machine translation of CN 108589473A, Year 2018. (Year: 2018).*
English machine translation of CN 107352853A, Year 2017. (Year: 2017).*
Machine Translation of CN 106830765 B. (Year: 2019).*

* cited by examiner

*Primary Examiner* — Coris Fung
*Assistant Examiner* — Catriona M Corallo
(74) *Attorney, Agent, or Firm* — Cesari & McKenna, LLP

(57) ABSTRACT

The present invention provides a method for preparing a hot-mixed asphalt mixture, and relates to the technical field of road engineering. In the present invention, asphalt and aggregates are preheated separately, where the aggregates include coarse aggregates and fine aggregates; the coarse aggregates, part of the fine aggregates and asphalt that are preheated are subjected to a first mixing to obtain a first mixture; the remaining fine aggregates are added to the first mixture for a second mixing to obtain a second mixture; and a mineral powder is added to the second mixture for a third mixing, and discharging is conducted to obtain a hot-mixed asphalt mixture.

8 Claims, No Drawings

METHOD FOR PREPARING HOT-MIXED ASPHALT MIXTURE

CROSS REFERENCE TO RELATED APPLICATIONS

This application claims priority to Chinese Application No. 201910992801.3, filed on Oct. 18, 2019, the content of this application being hereby incorporated by reference in its entirety.

TECHNICAL FIELD

The present invention relates to the technical field of road engineering, and in particular to a method for preparing a hot-mixed asphalt mixture.

BACKGROUND

At present, in a conventional process for preparing a hot-mixed asphalt mixture, all coarse and fine aggregates are usually added into a mixing pot at once, and all the aggregates adsorb hot asphalt simultaneously. This conventional mixing method often ignores the influence of the lithology and surface area (SA) of an aggregate on its ability to adsorb asphalt, making the asphalt films formed on the surfaces of different aggregates have different thicknesses, which results in a certain impact on the compaction effect and pavement performance of a hot-mixed asphalt mixture. The asphalt film on the surface of a fine aggregate is relatively thick, the asphalt film on the surface of a coarse aggregate is thin and smooth, and the asphalt films on the edge and corner are thinner, and even there is no asphalt film on the edge and corner. Aggregates of the same particle size may also have asphalt films of different thicknesses formed on their surfaces due to the difference in lithology.

SUMMARY

In view of this, the present invention is intended to provide a method for preparing a hot-mixed asphalt mixture. In the mixing method provided by the present invention, the influence of the lithology and SA of an aggregate on its ability to adsorb asphalt is fully considered, and the aggregates are added proportionally in batches, which significantly improves the compaction effect and pavement performance of a hot-mixed asphalt mixture.

To achieve the above purpose, the present invention provides the following technical solutions.

A method for preparing a hot-mixed asphalt mixture includes the following steps:

preheating asphalt and aggregates separately, where the aggregates comprise coarse aggregates and fine aggregates;

subjecting the coarse aggregates, part of the fine aggregates and the asphalt that are preheated to a first mixing to obtain a first mixture;

adding the remaining fine aggregates to the first mixture for a second mixing to obtain a second mixture; and adding a mineral powder to the second mixture for a third mixing, and conducting discharging to obtain a hot-mixed asphalt mixture;

where, a ratio of a total work of adhesion of the coarse aggregates and the part of the fine aggregates corresponding to asphalt during the first mixing to a total work of adhesion of the remaining fine aggregates corresponding to asphalt during the second mixing is in a range of 0.98 to 1.02, and the part of the fine aggregates have a surface area (SA) smaller than that of the remaining fine aggregates; the total work of adhesion is calculated by formula 1:

$$\Delta G = \Sigma SA_i \cdot W_{asi} \quad \text{formula 1;}$$

and in formula 1, $\Delta G$ represents the total work of adhesion, mJ; $SA_i$ represents the SA of coarse aggregates or fine aggregates, $m^2$; $W_{asi}$ represents the work of adhesion of coarse aggregates or fine aggregates corresponding to asphalt, $mJ \cdot m^{-2}$; and $\Sigma$ represents summation.

Preferably, the asphalt is 70 #petroleum asphalt and/or SBS modified asphalt.

Preferably, the aggregate is limestone and/or basalt.

Preferably, the mineral powder is limestone mineral powder.

Preferably, the asphalt is pretreated at 150° C. to 175° C.

Preferably, the aggregate is pretreated at 180° C. to 190° C.

Preferably, the first mixing, the second mixing and the third mixing were conducted independently at 150° C. to 175° C. and independently for 60 s to 90 s.

Preferably, the mineral powder, before added, needs to be pretreated at 180° C. to 190° C.

Preferably, the discharging is conducted at 150° C. to 170° C.

The present invention provides a method for preparing a hot-mixed asphalt mixture. The present invention proposes the concept of total work of adhesion for the first time, which is used to express the total energy change during an adhesion process (i.e., a first mixing and a second mixing). Aggregates are added proportionally in batches under the following conditions: a ratio of a total work of adhesion of the coarse aggregates and the part of the fine aggregates corresponding to asphalt during the first mixing to a total work of adhesion of the remaining fine aggregates corresponding to asphalt during the second mixing is in a range of 0.98 to 1.02, and the part of the fine aggregates have an SA smaller than that of the remaining fine aggregates. In the present invention, the influence of the lithology and SA of an aggregate on its ability to adsorb asphalt is fully considered, unlike the conventional mixing method where all coarse and fine aggregates are added at once, aggregates are added in batches at a ratio quantitatively based on the total work of adhesion, which effectively improves the thickness uniformity for asphalt films formed on surfaces of different aggregates in a mixing system to obtain a hot-mixed asphalt mixture with uniform asphalt film distribution and excellent properties. Moreover, the present invention significantly improves the compaction effect and pavement performance of an asphalt mixture, so a mixture with the same volume parameter can be obtained with a reduced amount of asphalt. Furthermore, the present invention can give full play to the excellent properties of raw materials without increasing the production cost. With simple steps, easy implementation and significant improvement effect, the present invention is suitable for the preparation of asphalt mixtures for various surface structures and has broad application prospects.

DETAILED DESCRIPTION

The present invention provides a method for preparing a hot-mixed asphalt mixture, including the following steps:

preheating asphalt and aggregates separately, where the aggregates include coarse aggregates and fine aggregates;

subjecting the coarse aggregates, part of the fine aggregates and the asphalt that are preheated to a first mixing to obtain a first mixture;

adding the remaining fine aggregates to the first mixture for a second mixing to obtain a second mixture; and adding a mineral powder to the second mixture for a third mixing, and conducting discharging to obtain an asphalt mixture.

A ratio of a total work of adhesion of the coarse aggregates and the part of the fine aggregates corresponding to asphalt during the first mixing to a total work of adhesion of the remaining fine aggregates corresponding to asphalt during the second mixing is in a range of 0.98 to 1.02. The part of the fine aggregates have an SA smaller than that of the remaining fine aggregates. The total work of adhesion is calculated by formula 1:

$$\Delta G = \Sigma SA_i \cdot W_{asi} \quad \text{formula 1;}$$

and in formula 1, $\Delta G$ represents the total work of adhesion, mJ; $SA_i$ represents the SA of coarse aggregates or fine aggregates, m$^2$; $W_{asi}$ represents the work of adhesion of coarse aggregates or fine aggregates corresponding to asphalt, mJ·m$^{-2}$; and $\Sigma$ represents summation.

In the present invention, the asphalt and aggregates are preheated separately. In the present invention, the asphalt is preferably 70 #petroleum asphalt and/or SBS modified asphalt. In the present invention, the aggregates include coarse aggregates and fine aggregates, and the aggregate is preferably limestone and/or basalt. Aggregates are prepared by rolling unweathered or slightly-weathered stones into square-shaped gravel, and the stones do not include soil and impurities, and have characteristics, such as high hardness, rough surface and excellent cleanness. For expressways and class I highways, aggregates used in the surface layer have a crushing value not more than 26%, an L. A. abrasion loss not more than 28%, an apparent specific gravity not less than 2.60 t·m$^{-3}$, a water absorption rate not more than 2.0%, a content of flat and elongated particles not more than 15%, and a particle content <0.075 mm by water washing method not more than 1%.; and for highways of other classes, aggregates used in the surface layer have a crushing value not more than 30%, an L. A. abrasion loss not more than 35%, an apparent specific gravity not less than 2.45 t·m$^{-3}$, a water absorption rate not more than 3.0%, a content of flat and elongated particles not more than 20%, and a particle content <0.075 mm by water washing method not more than 1%. In the present invention, the asphalt is preheated preferably at 150° C. to 175° C.; when the asphalt is preferably 70 #petroleum asphalt, the asphalt is preheated further preferably at 150° C. to 160° C.; and when the asphalt is preferably SBS modified asphalt, the asphalt is preheated further preferably at 165° C. to 175° C. In the present invention, the aggregates are preheated preferably at 180° C. to 190° C. The present invention has no special requirements for the preheating method, and a preheating method well known in the art may be used.

In the present invention, the coarse aggregates, part of the fine aggregates and the asphalt that are preheated are subjected to a first mixing to obtain a first mixture. In the present invention, the first mixing is conducted preferably in a mixing pot, and specifically, the coarse aggregates and part of the fine aggregates are added to the mixing pot and well mixed preliminarily, and then the asphalt is added for a first mixing. In a specific embodiment of the present invention, the mixing pot is a small indoor mixing pot. In the present invention, the first mixing is conducted preferably at 150° C. to 175° C. (i.e., the temperature set for the mixing pot) and preferably for 60 s to 90 s; when the asphalt is 70 #petroleum asphalt, the first mixing is conducted further preferably at 150° C. to 160° C.; and when the asphalt is SBS modified asphalt, the first mixing is conducted further preferably at 165° C. to 175° C.

In the present invention, after the first mixture is obtained, the remaining fine aggregates are added to the first mixture for a second mixing to obtain a second mixture, that is, the remaining fine aggregates are added to the mixing pot with the first mixture for mixing. In the present invention, the second mixing is conducted at the same temperature as the first mixing, which will not be further described here.

In the present invention, after the second mixture is obtained, a mineral powder is added to the second mixture for a third mixing, and discharging is conducted to obtain an asphalt mixture. In the present invention, the mineral powder is preferably limestone mineral powder. The mineral powder should be dry and clean, not prone to agglomerate, and can flow out freely from a mineral powder silo. For expressways and class I highways, the mineral powder has an apparent specific gravity not less than 2.5 t·m$^{-3}$ and a moisture content not more than 1%; and for highways of other classes, the mineral powder has an apparent specific gravity not less than 2.45 t·m$^{-3}$ and a moisture content not more than 1%. In the present invention, the mineral powder, before added, is preferably preheated preferably at 180° C. to 190° C. In the present invention, the mineral powder is added to the mixing pot with the second mixture for mixing. In the present invention, the third mixing is conducted at the same temperature as the first mixing, which will not be further described here. After the third mixing is completed, discharging is conducted to obtain a hot-mixed asphalt mixture. In the present invention, the discharging is conducted preferably at 150° C. to 170° C.; when the asphalt is 70 #petroleum asphalt, the discharging is conducted further preferably at 150° C. to 155° C.; and when the asphalt is SBS modified asphalt, the discharging is conducted further preferably at 165° C. to 170° C.

In the art, aggregates, asphalt and a mineral powder are mixed at a mass ratio generally of 100:(3-5):(1-3), where the combined gradation of the aggregates meets the gradation range specified in "Technical Specification for Construction of Highway Asphalt Pavements (JTG F40-2004)". In the present invention, the part of the fine aggregates and the remaining fine aggregates need to have a mass ratio meeting the following conditions: a ratio of a total work of adhesion of the coarse aggregates and the part of the fine aggregates corresponding to asphalt during the first mixing to a total work of adhesion of the remaining fine aggregates corresponding to asphalt during the second mixing is in a range of 0.98 to 1.02. The part of the fine aggregates have an SA smaller than that of the remaining fine aggregates. The total work of adhesion is calculated by formula 1:

$$\Delta G = \Sigma SA_i \cdot W_{asi} \quad \text{formula 1;}$$

and in formula 1, $\Delta G$ represents the total work of adhesion, mJ; $SA_i$ represents the SA of coarse aggregates or fine aggregates, m$^2$; $W_{asi}$ represents the work of adhesion of coarse aggregates or fine aggregates corresponding to asphalt, mJ·m$^{-2}$; and $\Sigma$ represents summation. In the present invention, the SA is caclulated by multiplying specific surface area (SSA) by mass, and the SSA is calculated with reference to "Technical Specification for Construction of Highway Asphalt Pavements (JTG F40-2004)"; the work of adhesion of the coarse aggregates or fine aggregates corresponding to asphalt ($W_{asi}$) is calculated by formula 2 according to the surface energy theory:

$$W_{asi} = 2\sqrt{\gamma_s^{LW} \gamma_\alpha^{LW}} + 2\sqrt{\gamma_s^+ \gamma_\alpha^-} + 2\sqrt{\gamma_s^- \gamma_\alpha^+} \quad \text{formula 2;}$$

and in formula 2, $\gamma^{LW}$ is van der Waals component, mJ·m$^{-2}$; $\gamma^+$ is Lewis acid term, mJ·m$^{-2}$; $\gamma^-$ is Lewis base term, mJ·m$^{-2}$; a represents asphalt; s represents stone.

The formula 1 is used to calculate the total work of adhesion of the coarse aggregates and the part of the fine aggregates corresponding to asphalt during the first mixing and the total work of adhesion of the remaining fine aggregates corresponding to asphalt during the second mixing separately. When the coarse or fine aggregates in the first and second mixing include aggregates with different lithologies (such as including both limestone and basalt), the corresponding parameters of aggregates with different lithologies need to be substituted into formula 1 for summation to obtain the total work of adhesion during the first mixing and the total work of adhesion during the second mixing. In the present invention, when the total work of adhesion values during the two mixing processes have a ratio of 0.98 to 1.02, the obtained hot-mixed asphalt mixture has the optimal properties, and the corresponding ratio of the part of the fine aggregates to the remaining fine aggregates at this point is the optimal ratio for adding fine aggregates in batches.

The present invention proposes the concept of total work of adhesion for the first time. Aggregates are added proportionally in batches under the following conditions: a ratio of a total work of adhesion of the coarse aggregates and the part of the fine aggregates corresponding to asphalt during the first mixing to a total work of adhesion of the remaining fine aggregates corresponding to asphalt during the second mixing is in a range of 0.98 to 1.02, and the part of the fine aggregates have an SA smaller than that of the remaining fine aggregates. The coarse aggregates and the part of the fine aggregates have a relatively-small SA, and the remaining fine aggregates have a relatively-large SA. During the mixing processes, coarse aggregates and part of fine aggregates are added first, and then the remaining fine aggregates are added, making the distribution of the asphalt film more uniform. Moreover, the part of the fine aggregates and the remaining fine aggregates are added at a ratio that is quantified by controlling the ratio of the total work of adhesion values during the first mixing and the second mixing at 0.98 to 1.02. That is, in the present invention, the influence of the lithology and SA of an aggregate on its capacity to adsorb asphalt is fully considered, and the concept of total work of adhesion is adopted as a quantitative index for the capacity of aggregates with different particle sizes and lithologies to adsorb asphalt.

In the present invention, unlike a conventional mixing method where all coarse and fine aggregates are added at once, aggregates are added proportionally in batches to obtain a hot-mixed asphalt mixture, with uniform asphalt film distribution, stable performance and excellent compaction effect. Therefore, the present invention is suitable for the preparation of asphalt mixtures for various surface structures and has broad application prospects.

The method for preparing a hot-mixed asphalt mixture provided by the present invention will be described in detail below with reference to examples, but the examples should not be construed as limiting the claimed scope of the present invention.

Example 1

The results of a sieving and density test for the aggregates and mineral powder (limestone mineral powder) used are shown in Table 1 and Table 2, respectively.

TABLE 1

Results of the sieving test for the aggregates and mineral powder

| | Sieving rate for the aggregates at each grade and the mineral powder/% | | | | | | | |
|---|---|---|---|---|---|---|---|---|
| | Limestone | | | | | Basalt | | Mineral powder |
| Sieve size/mm | 10-20 mm | 10-15 mm | 5-10 mm | 3-5 mm | 0-3 mm | 10-15 mm | 5-10 mm | — |
| 26.5 | 100.0 | 100.0 | 100.0 | 100.0 | 100.0 | 100.0 | 100.0 | 100.0 |
| 19 | 95.3 | 100.0 | 100.0 | 100.0 | 100.0 | 100.0 | 100.0 | 100.0 |
| 16.0 | 35.2 | 98.1 | 100.0 | 100.0 | 100.0 | 100.0 | 100.0 | 100.0 |
| 13.2 | 6.4 | 94.6 | 100.0 | 100.0 | 100.0 | 90.5 | 100.0 | 100.0 |
| 9.5 | 0.0 | 9.4 | 99.4 | 100.0 | 100.0 | 10.2 | 98.0 | 100.0 |
| 4.75 | 0.0 | 0.2 | 4.9 | 97.8 | 100.0 | 0.2 | 8.9 | 100.0 |
| 2.36 | 0.0 | 0.2 | 0.5 | 13.7 | 85.2 | 0.2 | 4.3 | 100.0 |
| 1.18 | 0.0 | 0.2 | 0.5 | 8.7 | 60.7 | 0.2 | 2.4 | 100.0 |
| 0.6 | 0.0 | 0.2 | 0.5 | 2.9 | 29.1 | 0.2 | 2.4 | 99.9 |
| 0.3 | 0.0 | 0.2 | 0.5 | 2.7 | 25.6 | 0.2 | 2.4 | 97.9 |
| 0.15 | 0.0 | 0.2 | 0.5 | 2.7 | 14.7 | 0.2 | 2.4 | 92.0 |
| 0.075 | 0.0 | 0.2 | 0.5 | 2.7 | 9.6 | 0.2 | 2.4 | 79.5 |

TABLE 2

Results of the density test for the aggregates and mineral powder

| | Material | | | | | | | |
|---|---|---|---|---|---|---|---|---|
| | Limestone | | | | | Basalt | | Mineral powder |
| | 10-20 mm | 10-15 mm | 5-10 mm | 3-5 mm | 0-3 mm | 10-15 mm | 5-10 mm | — |
| Apparent density/ g·cm$^{-3}$ | 2.750 | 2.759 | 2.755 | 2.748 | 2.741 | 2.935 | 2.943 | 2.741 |
| Dry density/ g·cm$^{-3}$ | 2.705 | 2.703 | 2.707 | — | — | 2.820 | 2.782 | — |

70 #petroleum asphalt was adopted, which had performance indexes meeting the experimental requirements, and the design of 70 #petroleum asphalt+dense-graded hot-mixed asphalt mixture(AC-13) was carried out with the selected aggregates and mineral powder, where the combined gradation met the gradation range specified in "Technical Specification for Construction of Highway Asphalt Pavements (JTG F40-2004)". The aggregates of different grades and the mineral powder were added at the following mass ratio: (10-15) mm-grade (basalt):(5-10) mm-grade (basalt):(3-5) mm-grade (limestone):(0-3) mm-grade (limestone):mineral powder=21:30:3:44:2; and the asphalt and aggregates were added at a ratio of 4.68%.

(1) Based on the surface energy theory, the work of adhesion was calculated for different asphalt-aggregate interfaces. The results are shown in Table 3.

TABLE 3

Work of adhesion for different asphalt-aggregate interface (mixing stage)

| Adhesion interface | Work of adhesion $W_{as}$/mJ·m$^{-2}$ |
|---|---|
| 70# asphalt-limestone | 62.198 |
| 70# asphalt-basalt | 52.257 |

On the basis of work of adhesion $W_{as}$, the concept of total work of adhesion ($\Delta G$, calculated by formula 1) was proposed as a quantitative index for the capacity of aggregates with different particle sizes and lithologies to adsorb asphalt:

$$\Delta G = \Sigma SA_i \cdot W_{asi} \qquad \text{formula 1.}$$

In the formula, $\Delta G$ is the total work of adhesion, representing the total energy change during an adhesion process, mJ; $SA_i$ is the SA of aggregates (in which SA is calculated by multiplying SSA by mass, and the calculation method of the SSA can be seen in "Technical Specification for Construction of Highway Asphalt Pavements (JTG F40-2004)"), $m^2$; $W_{asi}$ is the work of adhesion of aggregates with a specific lithology to asphalt, $mJ \cdot m^{-2}$; and $\Sigma$ is summation.

(2) The ratio for adding aggregates in batches was adjusted to obtain the SA, and total work of adhesion values and ratio thereof for each feed under different processes. Details are shown in Table 4 and Table 5. In this example, the $\Delta G$ is calculated based on the total amount of the coarse aggregates and fine aggregates being 1 kg.

TABLE 4

Different ratios for adding aggregates in batches under different processes

| | Ratio for adding aggregates (first time)/% | | | |
|---|---|---|---|---|
| | Coarse aggregate | | | Fine aggregate |
| Process No. | Basalt 10 mm to 15 mm | Basalt 5 mm to 10 mm | Limestone 3 mm to 5 mm | Limestone 0 mm to 3 mm |
| 1 | 100 | 100 | 0 | 0 |
| 2 | 100 | 100 | 100 | 25 |
| 3 | 100 | 100 | 100 | 43 |
| 4 | 100 | 100 | 100 | 60 |
| 5 | 100 | 100 | 100 | 75 |
| 6 (conventional process) | 100 | 100 | 100 | 100 |

TABLE 5

SSA, and total work of adhesion values and ratio thereof for each feed (aggregates) under different processes

| Process No. | $SSA^*_1$/ $m^2 \cdot Kg^{-1}$ | $SSA^*_2$/ $m^2 \cdot Kg^{-1}$ | $\Delta G_1$/ $mJ \cdot Kg^{-1}$ | $\Delta G_2$/ $mJ \cdot Kg^{-1}$ | $\Delta G_1:\Delta G_2$ |
|---|---|---|---|---|---|
| 1 | 0.669 | 4.511 | 34.960 | 280.575 | 0.12 |
| 2 | 0.669 + 1.186 | 3.325 | 108.727 | 206.808 | 0.52 |
| 3 | 0.669 + 1.984 | 2.527 | 158.361 | 157.174 | 1.00 |
| 4 | 0.669 + 2.659 | 1.773 | 200.344 | 110.277 | 1.80 |
| 5 | 0.669 + 3.402 | 1.108 | 246.558 | 68.915 | 3.56 |
| 6 (conventional process) | 0.669 + 4.510 | — | 315.473 | — | — |

Notes:
$SSA^*_1$ and $SSA^*_2$ represent the SSAs of aggregates added during the two adhesion processes, respectively; and $\Delta G_1$ and $\Delta G_2$ represent the total work of adhesion values during the two adhesion processes, respectively.

(3) The above aggregates, asphalt and mineral powder were mixed and compacted indoors. The mixing for processes 1 to 5 mainly included the following steps:

(a) 70 #petroleum asphalt and aggregates were preheated separately. The asphalt was preheated at 160° C., and the aggregates were preheated at 175° C.

(b) Part of the aggregates was mixed with all asphalt. According to the ratio for adding aggregates in batches for processes 1 to 5 shown in Table 4, part of the aggregates were mixed with asphalt first at 155° C. for 60 s.

(c) The remaining aggregates were added to the mixture obtained in step (b) for mixing, that is, the remaining aggregates were mixed with the mixture obtained in step (b) at 155° C. for 60 s.

(d) A mineral powder was added to the mixture obtained in step (c) for mixing. The mineral powder was preheated at 185° C., and the mixing was conducted at 155° C. for 60 s.

(e) Discharging was conducted for the mixture obtained in step (d) at a controlled temperature of about 155° C., and compaction was conducted at 150° C. to 155° C. to obtain a test piece.

The mixing for process 6 (conventional process) mainly included the following steps:

(A) 70 #petroleum asphalt and aggregates were preheated separately. The asphalt was preheated at 160° C., and the aggregates were preheated at 175° C.

(B) All aggregates were mixed with all asphalt. The mixing was conducted at 155° C. for 90 s.

(C) A mineral powder was added to the mixture obtained in step (B) for mixing. The mineral powder was preheated at 185° C., and the mixing was conducted at 155° C. for 90 s.

(D) Discharging was conducted for the mixture obtained in step (C) at a controlled temperature of about 155° C., and shaping was conducted at 150° C. to 155° C. to obtain a test piece.

Example 2

Laboratory tests were conducted for the hot-mixed asphalt mixtures prepared according to different mixing processes in Example 1, and the differences among different mixing processes were determined in terms of volume index and pavement performance. Detailed results are shown in Table 6.

TABLE 6

Performance indexes for AC-13 asphalt mixtures prepared according to different mixing processes

| Process No. | $\Delta G_1:\Delta G_2$ | VV/% | DS/ time · $mm^{-1}$ | TSR/% | Work of rupture/ N · m |
|---|---|---|---|---|---|
| 1 | 0.12 | 3.86 (2.9) | 1395 (2.4) | 82.9 (4.1) | 23.9 (5.2) |
| 2 | 0.52 | 3.8 (2.8) | 1561 (4.7) | 85.4 (2.7) | 25.2 (6.4) |
| 3 | 1.00 | 3.78 (1.4) | 1886 (3.4) | 87.1 (2.3) | 25.2 (4.9) |
| 4 | 1.80 | 3.8 (2.5) | 1621 (2.4) | 85.1 (4.5) | 24.7 (2.5) |
| 5 | 3.56 | 3.91 (4.1) | 1331 (3.5) | 82.9 (2.5) | 23.9 (3.8) |
| 6 (conventional process) | — | 4.01 (1.2) | 1251 (2.1) | 82.7 (3.8) | 22.9 (4.2) |

Notes:
VV is the porosity of a compacted asphalt mixture; DS is the dynamic stability in a rut test for an asphalt mixture, representing the high-temperature performance; TSR is the freeze-thaw splitting strength ratio, representing the water-stability performance; the work of rupture refers to the area enclosed by the first half of the force-displacement curve before the peak during a low-temperature splitting test, representing the low-temperature crack-resistance of an asphalt mixture; and the number in brackets in the table is the coefficient of variation (CV), %.

It can be seen from Table 6 that compared with the conventional process (process 6), the optimized process where aggregates are added in batches according to the ability to adsorb asphalt can reduce the porosity of the obtained mixture, and significantly improve the high-temperature performance and water-stability performance of the obtained mixture; when $\Delta G_1$ is close to $\Delta G_2$ (process 3, $\Delta G_1:\Delta G_2=1$), the optimal improvement effect is obtained; and the adding method of aggregates exhibits no significant effect on the low-temperature performance. That is, by adding aggregates in twice so that the total work of adhesion values during the two processes for adhesion of asphalt to aggregates are the same or similar, the thickness uniformity of the asphalt film formed on the surface of aggregates with different SAs and lithologies can be improved to a certain extent, and the adhesion effect at the asphalt-aggregate interface can be enhanced, resulting in an asphalt mixture with higher compactness, uniform asphalt film distribution and better performance.

Example 3

SBS modified asphalt was adopted, and the design of SBS modified asphalt+dense-graded hot-mixed asphalt mixture (SMA-13) was carried out with the aggregates and mineral powder used in Example 1, where the combined gradation met the gradation range specified in "Technical Specification for Construction of Highway Asphalt Pavements (JTG F40-2004)". The aggregates of different grades had adding ratios and SSAs shown in Table 7.

TABLE 7

Adding ratio and SSA for aggregates of each grade in the SMA-13 hot-mixed asphalt mixture

| | Particle size/mm | | | | |
|---|---|---|---|---|---|
| | Basalt 10 mm to 15 mm | Basalt 5 mm to 10 mm | Limestone 3 mm to 5 mm | Limestone 0 mm to 3 mm | Mineral powder |
| SSA/m$^2$ · Kg$^{-1}$ | 0.524 | 1.819 | 2.532 | 9.874 | 49.517 |
| Mass ratio/% | 40 | 35 | 2 | 15 | 8 |

Under different processes for the SMA-13 hot-mixed asphalt mixture, aggregates were added in batches at a ratio shown in Table 8.

TABLE 8

Different ratios for adding aggregates in batches under different processes for the SMA-13 hot-mixed asphalt mixture

| | Ratio for adding aggregates (first time)/% | | | |
|---|---|---|---|---|
| | Coarse aggregate | | | Fine aggregate |
| Process No. | Basalt 10 mm to 15 mm | Basalt 5 mm to 10 mm | Limestone 3 mm to 5 mm | Limestone 0 mm to 3 mm |
| 1 | 100 | 100 | 0 | 0 |
| 2 | 100 | 100 | 100 | 27 |
| 3 | 100 | 100 | 100 | 40 |
| 4 (conventional process) | 100 | 100 | 100 | 100 |

The above aggregates, asphalt and mineral powder were mixed and compacted indoors. The mixing for processes 1 to 3 refers to steps (a) to (e) in Example 1, and the mixing for process 4 refers to steps (A) to (D) in Example 1. Performance indexes for SMA-13 asphalt mixtures prepared according to different mixing processes are shown in Table 9.

TABLE 9

Performance indexes for SMA-13 asphalt mixtures prepared according to different mixing processes

| Process No. | ΔG1:ΔG2 | VV/% | DS/time · mm$^{-1}$ | TSR/% | Work of rupture/ N · m |
|---|---|---|---|---|---|
| 1 | 0.42 | 3.91 (1.8) | 4705 (4.7) | 85.7 (2.5) | 43.5 (2.8) |
| 2 | 1.01 | 3.82 (2.7) | 5187 (3.4) | 89.1 (1.7) | 43.9 (3.7) |
| 3 | 1.45 | 3.95 (3.9) | 4874 (4.3) | 86.9 (2.1) | 42.9 (4.9) |
| 4 (conventional process) | — | 4.05 (2.0) | 451 (3.9) | 83.9 (0.8) | 41.5 (2.0) |

Example 4

70 #petroleum asphalt was adopted, and the design of 70 #petroleum asphalt+dense-graded hot-mixed asphalt mixture(AC-20) was carried out with the aggregates and mineral powder used in Example 1, where the combined gradation met the gradation range specified in "Technical Specification for Construction of Highway Asphalt Pavements (JTG F40-2004)". The aggregates of different grades had adding ratios and SSAs shown in Table 10.

TABLE 10

Adding ratio and SSA for aggregates of each grade in the AC-20 hot-mixed asphalt mixture

| | Particle size/mm | | | | |
|---|---|---|---|---|---|
| | Basalt 10 mm to 20 mm | Basalt 10 mm to 15 mm | Limestone 5 mm to 10 mm | Limestone 0 mm to 3 mm | Mineral powder |
| SSA/m$^2$ · Kg$^{-1}$ | 0.524 | 1.819 | 2.532 | 9.878 | 49.517 |
| Mass ratio/% | 28 | 17 | 13 | 40 | 2 |

Under different processes for the AC-20 hot-mixed asphalt mixture, aggregates were added in batches at a ratio shown in Table 11.

TABLE 11

Different ratios for adding aggregates in batches under different processes for the AC-20 hot-mixed asphalt mixture

| | Ratio for adding aggregates (first time)/% | | | |
|---|---|---|---|---|
| | Coarse aggregate | | | Fine aggregate |
| Process No. | Basalt 10 mm to 20 mm | Basalt 10 mm to 15 mm | Limestone 5 mm to 10 mm | Limestone 0 mm to 3 mm |
| 1 | 100 | 100 | 100 | 0 |
| 2 | 100 | 100 | 100 | 46 |
| 3 | 100 | 100 | 100 | 70 |
| 4 (conventional process) | 100 | 100 | 100 | 100 |

The above aggregates, asphalt and mineral powder were mixed and compacted indoors. The mixing for processes 1 to 3 refers to steps (a) to (e) in Example 1, and the mixing for process 4 refers to steps (A) to (D) in Example 1. Performance indexes for AC-20 asphalt mixtures prepared according to different mixing processes are shown in Table 12.

TABLE 12

Performance indexes for AC-20 asphalt mixtures prepared according to different mixing processes

| Process No. | ΔG1:ΔG2 | VV/% | DS/time · mm$^{-1}$ | TSR/% | Work of rupture/ N · m |
|---|---|---|---|---|---|
| 1 | 0.08 | 3.89 (1.1) | 1389 (3.4) | 81.2 (2.5) | 28.1 (4.1) |
| 2 | 0.99 | 3.72 (3.2) | 1674 (4.1) | 85.1 (2.4) | 28.3 (4.2) |
| 3 | 2.58 | 3.93 (3.1) | 1425 (2.7) | 80.9 (3.5) | 27.3 (2.9) |
| 4 (conventional process) | — | 4.03 (1.5) | 1347 (1.9) | 79.4 (3.7) | 26.4 (3.3) |

It can be also seen from Table 9 of Example 3 and Table 12 of Example 4 that, by optimizing the conventional process and adjusting the adding manner of aggregates, the obtained hot-mixed asphalt mixture can have higher compactness and significantly-improved pavement performance; the improvement in high-temperature performance and water-stability performance is relatively significant; and when $\Delta G_1$ is close to $\Delta G_2$ (with a ratio of 0.98 to 1.02), the optimal improvement effect is obtained.

It can be seen from the above examples that, in the method for preparing a hot-mixed asphalt mixture provided in the present invention, the adding manner of aggregates in the conventional process of a hot-mixed asphalt mixture is modified, and a quantitative basis is proposed for the ratio for adding aggregates in batches, which significantly improves the compaction effect and pavement performance of an asphalt mixture without increasing the production cost. With simple steps and easy implementation, the method has broad application prospects.

The above descriptions are merely preferred implementations of the present invention. It should be noted that a person of ordinary skill in the art may further make several improvements and modifications without departing from the principle of the present invention, but such improvements and modifications should be deemed as falling within the protection scope of the present invention.

What is claimed is:

1. A method for preparing a hot-mixed asphalt mixture, comprising the following steps:
preheating asphalt and aggregates separately, wherein the aggregates comprise coarse aggregates and fine aggregates,
wherein the coarse aggregates are basalt having a particle size of 5-15 mm or a combination of limestone having a particle size of 3-5 mm and basalt having a particle size of 5-15 mm; and wherein the fine aggregates are limestone having a particle size of no larger than 3 mm;
subjecting the coarse aggregates, part of the fine aggregates and the asphalt that are preheated to a first mixing to obtain a first mixture;
adding only the remaining fine aggregates to the first mixture for a second mixing to obtain a second mixture; and
adding a mineral powder to the second mixture for a third mixing, and conducting discharging to obtain the hot-mixed asphalt mixture;
wherein a ratio of a total work of adhesion of the coarse aggregates and the part of the fine aggregates corresponding to asphalt during the first mixing to a total work of adhesion of the remaining fine aggregates corresponding to asphalt during the second mixing is in a range of 0.98 to 1.02, and the part of the fine aggregates have a surface area (SA) smaller than that of the remaining fine aggregates; the total work of adhesion is calculated by formula 1:

$$\Delta G = \Sigma SA_i \cdot W_{asi} \quad \text{formula 1;}$$

and in formula 1, ΔG represents the total work of adhesion, mJ; $SA_i$ represents the SA of coarse aggregates or fine aggregates, m$^2$; $W_{asi}$ represents the work of adhesion of coarse aggregates or fine aggregates corresponding to asphalt, mJ·m$^{-2}$; and Σ represents summation.

2. The method according to claim 1, wherein the asphalt is 70 #petroleum asphalt and/or styrene-butadiene-styrene modified asphalt.

3. The method according to claim 1, wherein the mineral powder is limestone mineral powder.

4. The method according to claim 1, wherein the asphalt is pretreated at 150° C. to 175° C.

5. The method according to claim 1, wherein the aggregate is pretreated at 180° C. to 190° C.

6. The method according to claim 1, wherein the first mixing, the second mixing and the third mixing were conducted independently at 150° C. to 175° C. and independently for 60 s to 90 s.

7. The method according to claim 1, wherein the mineral powder is pretreated at 180° C. to 190° C. before adding it to the second mixture.

8. The method according to claim 1, wherein the discharging is conducted at 150° C. to 170° C.

* * * * *